United States Patent Office 2,806,070
Patented Sept. 10, 1957

2,806,070

PROCESS OF PRODUCING POLYCHLORO BENZENES FROM HEXACHLORO CYCLOHEXANES

Joachim Mattner, Berlin-Charlottenburg, Germany, assignor to Schering A. G., Berlin, Germany, a corporation of Germany No Drawing. Application May 13, 1954,
Serial No. 429,700

Claims priority, application Germany May 20, 1953

5 Claims. (Cl. 260—650)

The present invention relates to a process of producing polychloro benzenes and more particularly to a process of producing polychloro benzenes and especially hexachloro benzene from 1,2,3,4,5,6 hexachloro cyclohexanes.

When producing gamma-1,2,3,4,5,6 hexachloro cyclohexane, it is not possible to completely avoid the formation of isomers of said gamma-1,2,3,4,5,6 hexachloro cyclohexane. Satisfactory utilization of said 1,2,3,4,5,6 hexachloro cyclohexane isomers is a very important technical problem, since it will considerably reduce the cost of of the valuable gamma-1,2,3,4,5,6 hexachloro cyclohexane.

Heretofore attempts have been made to convert said mixture of 1,2,3,4,5,6 hexachloro cyclohexane isomers into polychloro benzenes and especially into hexachloro benzene by first splitting off three mols of hydrogen chloride and then adding chlorine to the resulting reaction products, or by first chlorinating said isomers and then splitting off hydrogen chloride. These methods of recovering and utilizing the inactive 1,2,3,4,5,6 hexachloro cyclohexane isomers, however, do not yield satisfactory results and do not permit continuous operation.

It is one object of the present invention to provide a simple and effective process of converting said 1,2,3,4,5,6 hexachloro cyclohexane isomers into polychloro benzenes and especially into hexachloro benzene.

Another object of this invention is to provide a one-step process of converting 1,2,3,4,5,6 hexachloro cyclohexane isomers into polychloro benzenes and especially hexachloro benzene, which process permits continuous operation.

A further object of this invention is to provide a process of producing lower chlorinated benzenes such as tetrachloro benzene, trichloro benzene, and others, besides hexachloro benzene.

Other objects of the present invention and advantageous features thereof will become apparent as the description proceeds.

In principle, the process according to the present invention comprises subjecting said mixture of 1,2,3,4,5,6 hexachloro cyclohexane isomers to a one-step dehydrogenation process. Said dehydrogenation is carried out by reacting said mixture of 1,2,3,4,5,6 hexachloro cyclohexane isomers with chlorine in the gaseous phase at elevated temperature above about 200° C. and preferably above 350° C.

The process according to the present invention has not only the advantage that it permits continuous operation but it offers furthermore the possibility to produce lower chlorinated benzenes by simply reducing the amount of chlorine used in this reaction. It is even possible to operate without chlorine whereby the reaction conditions correspond to thermal splitting off of hydrogen chloride.

The reaction is carried out by evaporating the 1,2,3,4,5,6 hexachloro cyclohexane isomers and by conducting their vapors in mixture with chlorine through the reaction chamber. Said reaction chamber is preferably filled with catalysts as they will be described hereinafter and is kept at the desired reaction temperature.

Precipitation and separation of the resulting polychloro benzenes from the gas stream leaving the reaction chamber is rather difficult especially when carrying out the process on a large scale. According to the present invention it has been proved to be of advantage to remove said polychloro benzenes by absorption in suitable solvents.

This process has a number of remarkable advantages over other processes of removing said compounds from the reaction gases, such as by means of settling chambers, cyclones, and the like.

It could not be expected that absorption of said polychloro benzenes insolvents would yield satisfactory results and would have the advantages hereinafter described as follows:

The heat of the reaction gases and the heat of condensation of the resulting polychloro benzenes is taken up by the solvent and subsequently can be utilized, for instance, for evaporation of said solvent. Said heat of the reaction gases and said heat of condensation, therefore, can again very readily be eliminated in the form of heat of condensation while when using cyclones or settling chambers elimination of said heat is much more difficult.

The temperature of the solvent used for absorption of said polychloro benzenes is preferably kept above 100° C. Thereby the water formed during reaction is not condensed but remains in the vapor phase. In this manner additional drying of the polychloro benzenes to be recovered is avoided. Such drying, however, would be required when precipitating the polychloro benzenes, for instance, in cooled settling chambers.

Especially suitable is the use of limited amounts of solvents for said absorption. In this process of producing polychloro benzenes according to the present invention there are formed hexachloro benzene, tetrachloro benzene, and occasionally trichloro benzene. When conducting, for instance, the gaseous reaction mixture into and through a solvent at elevated temperature and using an amount of solvent just sufficient to cause saturation or near-saturation of said solvent with tetrachloro benzene at such temperature at which separation of hexachlorobenzene shall take place pure hexachloro benzene precipitates on cooling. In this manner separation of the polychloro benzenes from the reaction gases is very advantageously combined with a purification of hexachloro benzene. Thereby it has been found to be especially advantageous that hexachloro benzene is in general more difficultly soluble than tetrachloro benzene.

The reaction products are obtained in liquid form in this separation step. This is another advantage since liquid substances can more readily be handled and transported than solid products.

Trichloro benzene has proved to be an especially advantageous solvent. It can be produced in the same apparatus in which hexachloro benzene and tetrachloro benzene are obtained as shall be described more in detail hereinafter. It is only necessary to limit the supply of air and to heat the mixture of 1,2,3,4,5,6 hexachloro cyclohexane isomers to a higher temperature.

In comparison with other solvents, trochloro benzene has a very high dissolving power with respect to hexachloro benzene and tetrachloro benzene. Since trichloro benzene is also formed in the process according to the present invention, it is not necessary to add a fourth compound, besides hexachloro benzene, tetrachloro benzene, and trichloro benzene, as solvent to the reaction mixture since the solvent itself is one of the reaction products.

The boiling point of trichloro benzene is relatively high. This has a very favorable effect upon the solubility of hexachloro benzene and tetrachloro benzene since the solvent can be heated to a higher temperature and thereby absorbs larger amounts of said polychloro benzenes. It also entails a very low loss in solvent since the vapor pressure of trichloro benzene is comparatively low at room temperature. Losses in trichloro benzene are partly or entirely compensated for by the trichloro benzene formed during the reaction according to the present invention.

The reaction gases contain usually also varying amounts of chlorine. Such chlorine has a chlorinating effect upon trichloro benzene used as solvent, especially at elevated temperature. As a result thereof, trichloro benzene is converted into the more valuable higher chlorinated benzenes. In this manner the further advantage is achieved that excess chlorine, the removal of which from the residual waste gases is rather difficult, can be utilized in a profitable manner and is thereby at least partly eliminated.

The distillation residue of the mother liquor remaining after cooling the solvent saturated with tetrachloro benzene and removing the precipitated hexachloro benzene, contains tetrachloro benzene and a small amount of hexachloro benzene. This residue can advantageously be chlorinated to form hexachloro benzene by methods known per se without having to remove the solvent completely, since trichloro benzene is also converted into hexachloro benzene by chlorination.

When adding chlorine as hydrogen acceptor to the gas mixture consisting of 1,2,3,4,5,6 hexachloro cyclohexane isomers, said mixture is preferably passed through a reaction chamber filled with a chlorination catalyst.

The reaction temperature is preferably kept at about 400° C. It is, however, also possible to carry out the reaction at higher temperatures up to 600° C. or at lower temperatures. It is quite surprising that higher temperatures can be employed since it is stated in the literature that, on exceeding a temperature of 350° C., even in the chlorination of trichloro benzene, disturbing side-reactions such as formation of soot may take place. It is, however, very desirable to operate at as high a reaction temperature as possible in order to increase the speed of reaction. Said higher temperature not only considerably increases the speed of chlorination but also the speed of splitting off hydrogen chloride from polychloro cyclohexanes. As a result thereof, the presence of such unreacted polychloro cyclohexanes in the reaction products is substantially avoided. These polychloro cyclohexanes are, however, present in said reaction product and will contaminate said product if hydrogen chloride is split off from said polychloro cyclohexanes at too slow a rate and incompletely.

When employing about 3.5 moles of chlorine for each mol of 1,2,3,4,5,6 hexachloro cyclohexane, almost substantially pure white hexachloro benzene is obtained which compound precipitates in crystalline form in the collecting flask. Furthermore, six mols of gaseous hydrogen chloride are produced per mol of hexachloro cyclohexane.

The following examples serve to illustrate the present invention without, however, limiting the same thereto:

Example 1

A mixture of 1,2,3,4,5,6 hexachloro cyclohexane isomers and chlorine in the molecular ratio of approximately 1:4 is passed at 350–370° C. through a tube filled with aluminum oxide and having a capacity of about one liter. 324 g. of said 1,2,3,4,5,6 hexachloro cyclohexane isomers are passed per hour through said tube. 270 g. of hexachloro benzene (85%) and 30 g. of tetrachloro benzene (12.5%) are obtained within each hour.

Example 2

About the same reaction mixture is worked up as described in Example 1, whereby, however, the reaction temperature is 450–470° C. The resulting almost pure hexachloro benzene is washed with methanol and contains 97–98% thereof. It is obtained in colorless crystals.

Other dehydrogenation catalysts than aluminum oxide used in Examples 1 and 2 may be employed such as 10% palladium charcoal catalyst or cupric phosphate or ferric chloride on silicagel.

As solvent there may be used, in place of the preferred trichloro benzene, monochlorbenzene carbontetrachloride, tetralin, toluene.

The reaction temperature may be as high as 600° C. but should not be lower than about 200° C. Temperatures between 350° C. and 470° C. are the most preferred temperatures.

The solvent is preferably heated to a temperature of 110° C. so that any water present in the reaction gases will not be condensed but will remain in the non-absorbed residual gas mixture.

In place of calcium chloride and barium acetate as well as cobalt, nickel, and manganese chloride, there may be used other salts of said metals or salts of other metals such as strontium.

Other changes and variations in the reaction conditions, temperatures and duration, ratio of chlorine and/or oxygen to 1,2,3,4,5,6-hexachloro cyclohexane in the reaction gas mixture, velocity of flow of said reaction gas mixture, type of solvent used and its amount and temperature, methods of working up the absorbed polychloro benzenes and of purifying said reaction products, and the like, may be made by those skilled in the art in accordance with the principles set forth herein and in the claims annexed hereto.

I claim:

1. In a process of producing polychloro benzenes mainly consisting of hexachloro benzene from 1,2,3,4,5,6 hexachloro cyclohexanes, the steps comprising passing a gaseous mixture of chlorine and 1,2,3,4,5,6 hexachloro cyclohexane isomers obtained as by-products in the production of gamma-1,2,3,4,5,6 hexachloro cyclohexane, the molecular ratio of 1,2,3,4,5,6 hexachloro cyclohexane to chlorine in said mixture being about 1:4, through an aluminum oxide catalyst at a temperature between about 350° C. and about 470° C., conducting the resulting reaction gases into and through trichloro benzene heated above 100° C. its boiling point to absorb the polychloro benzenes contained in said reaction gases, and cooling the resulting trichloro benzene solution substantially saturated, in the cold, with tetrachloro benzene to precipitate crystalline hexachloro benzene from said solution.

2. In a process of producing polychloro benzenes mainly consisting of hexachloro benzene from 1,2,3,4,5,6 hexachloro cyclohexanes, the step comprising passing a mixture of 1,2,3,4,5,6 hexachloro cyclohexane isomers, obtained as byproducts in the production of gamma-1,2,3,4,5,6 hexachloro cyclohexane, in the gaseous phase together with chlorine in the presence of aluminum oxide at a temperature exceeding about 350° C. through a dehydrogenating zone, said hexachloro cyclohexane isomers and said chlorine being present in the reaction mixture in the molar ratio between about 1:3.5 and about 1:4.0.

3. In a process of producing polychloro benzenes from 1,2,3,4,5,6 hexachloro cyclohexanes, the steps comprising passing a mixture of 1,2,3,4,5,6 hexachloro cyclohexane isomers, obtained as byproducts in the production of gamma-1,2,3,4,5,6 hexachloro cyclohexane, in the gaseous phase together with chlorine in the presence of aluminum oxide at a temperature exceeding 200° C. through a dehydrogenating zone, said hexachloro cyclohexane isomers and said chlorine being present in the reaction mixture in the molar ratio between about 1:3.5 and about 1:4.0, introducing the resulting gaseous reaction products into a solvent for said reaction products, and removing said reaction products from said reaction gases by absorption in said solvent.

4. In a process of producing polychloro benzenes from 1,2,3,4,5,6 hexachloro cyclohexanes, the steps comprising passing a mixture of 1,2,3,4,5,6 hexachloro cyclohexane isomers, obtained as byproducts in the production of gamma-12,3,4,5,6 hexachloro cyclohexane, in the gaseous phase together with chlorine in the presence of aluminum oxide at a temperature exceeding 200° C. through a dehydrogenating zone, said hexachloro cyclohexane isomers and said chlorine being present in the reaction mixture in the molar ratio between about 1:3.5 and about 1:4.0, introducing the resulting gaseous reaction products into trichloro benzene to absorb the polychloro benzenes formed by said dehydrogenation reaction, and discharging the residual reaction gases.

5. In a process of producing polychloro benzenes from 1,2,3,4,5,6 hexachloro cyclohexanes, the steps comprising passing a mixture of 1,2,3,4,5,6 hexachloro cyclohexane isomers, obtained as byproducts in the production of gamma-1,2,3,4,5,6 hexachloro cyclohexane, in the gaseous phase together with chlorine in the presence of aluminum oxide at a temperature exceeding 200° C. through a dehydrogenating zone, said hexachloro cyclohexane isomers and said chlorine being present in the reaction mixture in the molar ratio between about 1:3.5 and about 1:4.0, conducting the resulting gaseous reaction products through a liquid solvent heated to a temperature above 100° C., said solvent being present in an amount sufficient to become saturated, at the temperature at which separation of hexachloro benzene is to be effected, with tetrachloro benzene contained in the reaction gases and absorbed by said solvent, and discharging the residual reaction gases substantially free of polychloro benzenes from said solvent extraction zone.

References Cited in the file of this patent

UNITED STATES PATENTS

| | | |
|---|---|---|
| 2,152,890 | Kipper | Apr. 4, 1939 |
| 2,221,301 | Kipper | Nov. 12, 1940 |
| 2,725,406 | Glaser | Nov. 29, 1955 |

FOREIGN PATENTS

| | | |
|---|---|---|
| 503,063 | Belgium | Nov. 5, 1951 |
| 1,036,840 | France | Apr. 29, 1953 |
| 1,048,239 | France | July 29, 1953 |
| 1,048,240 | France | July 29, 1953 |
| 1,058,619 | France | Nov. 4, 1953 |

OTHER REFERENCES

Berkman et al.: "Catalysis," pp. 888–906 (1940).